United States Patent
Kodi et al.

(10) Patent No.: US 7,299,376 B2
(45) Date of Patent: Nov. 20, 2007

(54) APPARATUS, SYSTEM, AND METHOD FOR VERIFYING BACKUP DATA

(75) Inventors: Sathees Babu Kodi, San Jose, CA (US); Sriram Palapudi, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 10/925,852

(22) Filed: Aug. 25, 2004

(65) Prior Publication Data

US 2006/0048002 A1    Mar. 2, 2006

(51) Int. Cl.
*G06F 11/00*    (2006.01)
(52) U.S. Cl. .......................................... 714/6
(58) Field of Classification Search .................. 714/6
See application file for complete search history.

(56) References Cited

U.S. PATENT DOCUMENTS

| | | | |
|---|---|---|---|
| 5,566,297 A | 10/1996 | Devarakonda et al. .. | 395/182.13 |
| 5,592,618 A * | 1/1997 | Micka et al. .................. | 714/54 |
| 5,625,699 A | 4/1997 | Yamada ....................... | 395/621 |
| 6,035,412 A * | 3/2000 | Tamer et al. .................... | 714/6 |
| 6,154,877 A | 11/2000 | Ramkumar et al. ............ | 717/11 |
| 6,249,883 B1 | 6/2001 | Cassidy et al. ............... | 714/42 |
| 6,269,406 B1 | 7/2001 | Dutcher et al. .............. | 709/248 |
| 6,314,501 B1 | 11/2001 | Gulick et al. ................ | 711/153 |
| 6,477,583 B1 | 11/2002 | Zayas et al. ................. | 709/248 |
| 6,671,688 B1 | 12/2003 | Nikols et al. ................. | 707/10 |
| 6,691,245 B1 * | 2/2004 | DeKoning ...................... | 714/6 |
| 6,742,138 B1 * | 5/2004 | Gagne et al. ................... | 714/6 |
| 6,948,089 B2 * | 9/2005 | Fujibayashi .................... | 714/6 |
| 7,065,589 B2 * | 6/2006 | Yamagami .................. | 709/246 |
| 7,120,769 B2 * | 10/2006 | Yagawa et al. ............. | 711/162 |
| 2002/0032883 A1 * | 3/2002 | Kampe et al. ................ | 714/16 |
| 2003/0172158 A1 | 9/2003 | Pillai et al. ................. | 709/225 |
| 2004/0260899 A1 * | 12/2004 | Kern et al. ................. | 711/162 |
| 2006/0048002 A1 * | 3/2006 | Kodi et al. ................... | 714/13 |

FOREIGN PATENT DOCUMENTS

| | | |
|---|---|---|
| EP | 1 145 128 | 12/1999 |
| EP | 1 164 484 | 12/2001 |
| WO | WO 99/57649 | 11/1999 |
| WO | WO 01/67247 | 9/2001 |
| WO | WO 03/003209 | 1/2003 |
| WO | WO 03/030449 | 4/2003 |
| WO | WO 03/094056 | 11/2003 |

\* cited by examiner

*Primary Examiner*—Bryce P. Bonzo
*Assistant Examiner*—Amine Riad
(74) *Attorney, Agent, or Firm*—Kunzler & McKenzie

(57) ABSTRACT

An apparatus, system, and method are disclosed for verifying backup data. A storage mapping module maps storage data that is to be backed up to an application module. A storage copy module copies the storage data to a backup copy and a backup copy module copies the backup copy to a verification copy. The backup copy and the verification copy are identical copies of an instance of the storage data. A verification mapping module maps the verification copy to the application module. A verification module verifies the verification copy using the application module. If the verification copy is valid, the backup copy is also valid. A control module may mark the backup copy as valid.

22 Claims, 8 Drawing Sheets

APPARATUS, SYSTEM, AND METHOD FOR VERIFYING BACKUP DATA

BACKGROUND OF THE INVENTION

1. Field of the Invention

This invention relates to verifying backup copies and more particularly relates to verifying a backup copy using a verification copy of the backup copy.

2. Description of the Related Art

A data processing system such as a computer or a server network typically includes a storage system for storing data. The storage system may be an array of hard disks, a library of removable storage media such as magnetic tape, an optical storage device, or the like. The data processing system often backs up storage data so that a copy of the storage data may be recovered if the storage data is lost or corrupted, or if a user needs to recover an earlier instance of the storage data. The user recovers the backup data by retrieving or copying the backup copy to the storage system and using the retrieved backup copy as the desired instance of the storage data.

The data processing system typically backs up the storage data by copying the storage data to backup copy. FIG. 1 illustrates a storage data backup 100. Storage data 105 is copied to a backup copy 110. The backup copy 110 is identical to the storage data 105 at an instance of time. Typically the backup copy 110 is relied on as a valid copy of the storage data 105 because the backup copy 110 is identical to an instance of the storage data 105.

Unfortunately, the backup copy 110 may not always be used to recover a storage data 105 instance from the backup copy 110 because the storage data 105 instance may be unusable to an application module such as a database application program that attempts to load and use the storage data 105 instance. For example, the storage data 105 instance may temporarily include data errors that prevent an application module from initially loading the storage data 105 instance. The application module can use the storage data 105 instance with the data errors if the application module is already using the storage data 105 instance. Contextual information may exist in an application module using the storage data 105 instance allow the application module to use the storage data 105 instance. In addition, the application module may subsequently resolve and remove the data errors. Yet because the contextual information is missing when the application module attempts to load the storage data 105 instance, the application module is unable to successfully load and use the storage data 105 instance. Because some storage data 105 instances cannot be loaded and used by an application module, not all backup copies 110 of storage data instances can be used to recover storage data.

From the foregoing discussion, it should be apparent that a need exists for an apparatus, system, and method that verify backup copies. Beneficially, such an apparatus, system, and method would assure that backup copies can be successfully loaded and used by an application module.

SUMMARY OF THE INVENTION

The present invention has been developed in response to the present state of the art, and in particular, in response to the problems and needs in the art that have not yet been fully solved by currently available backup data verification methods. Accordingly, the present invention has been developed to provide an apparatus, system, and method for verifying backup data that overcome many or all of the above-discussed shortcomings in the art.

The apparatus to verify backup data is provided with a logic unit containing a plurality of modules configured to functionally execute the necessary steps of verifying storage data backup copies. These modules in the described embodiments include a storage mapping module, a storage copy module, a backup copy module, a verification mapping module, and a verification module.

The storage mapping module is configured to map storage data to an application module. As used herein, mapping refers to associating data such as files, databases and the like with each application module needed to load and use the data. The application module may be a database application program, a data file management program, and the like. In one embodiment, the storage mapping module maps the storage data to a plurality of application modules. The application module is configured to verify the storage data. In one embodiment, the application module verifies the storage data by successfully loading the storage data. The application module may also be configured to use the storage data.

The storage copy module is configured to copy the storage data to a backup copy. The backup copy represents an instance in time of the storage data. The backup copy module copies the backup copy to a verification copy. Both the backup copy and the verification copy are identical copies of the storage data instance. The verification mapping module maps the verification copy to the application module. The mapping to the application module employs the storage mapping module's mapping of the storage data to the application module. The verification module verifies the verification copy using the first application module. In one embodiment, the application module verifies the storage data by successfully loading the verification copy. If the verification copy is verified, the backup copy is also verified as the backup copy is identical to the verification copy. The backup copy is not directly verified to prevent inadvertent corruption.

In one embodiment, the apparatus further comprises a control module. The control module marks the backup copy as verified if the verification copy is valid. In a certain embodiment, the control module copies the backup copy to an archive copy. The apparatus verifies the backup copy as valid before the apparatus is relied on as a valid copy of the storage data.

A system of the present invention is also presented to verify a backup copy. The system may be embodied in a data processing system. In particular, the system, in one embodiment, includes a storage system configured to store data and a data processing device including an input/output ("I/O") module, a memory module, a processor, a storage mapping module, a storage copy module, a backup copy module, a verification mapping module, and a verification module. The system may also comprise an identity module.

The storage system stores storage data. The data processing device communicates with the storage system through the I/O module. The identity module identifies the storage data on the storage system. In one embodiment, the identity module identifies the storage data from parameters supplied by a user. The storage mapping module maps the storage data to an application module. In one embodiment, the application module resides on the memory module. The storage copy module copies the storage data to a backup copy and the backup copy module copies the backup copy to a verification copy. The verification mapping module maps the verification copy to the application module. The verification module verifies the verification copy using the application module. The system verifies the backup copy without compromising the backup copy by manipulating the backup copy. In addition the system may verify the backup copy using the application modules normally used with the storage data.

A method of the present invention is also presented for verifying backup data. The method in the disclosed embodiments substantially includes the steps necessary to carry out the functions presented above with respect to the operation of the described apparatus and system. In one embodiment, the method includes identifying the storage data, mapping the storage data to an application module, copying the storage data to a backup copy, copying the backup copy to a verification copy, mapping the verification copy to the application module, and verifying the verification copy. The method also may include marking the backup copy as verified if the verification copy is verified.

An identity module identifies storage data and a storage mapping module maps the storage data to an application module. A storage copy module copies a first instance of the storage data to a backup copy and a backup copy module copies the backup data to a verification copy. A verification mapping module maps the verification copy to the application module and a verification module verifies the verification data using the application module.

In one embodiment, if the verification copy is not valid, the storage copy module copies a second instance of the storage data to the backup copy. The backup copy module copies the backup copy of the second storage data instance to the verification copy and the verification mapping module maps the verification copy of the second storage data instance to the application module. The verification module verifies the verification copy of the second storage data instance.

If the verification copy is again not valid, the method repeats until a storage data instance is verified as valid. In one embodiment, method repeatedly verifies storage data instances until a storage data instance is verified or until a specified number of storage data instances are found to be invalid by the verification module.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention verifies a backup copy of storage data as valid using a verification copy mapped to an application module associated with the storage data. The present invention prevents invalid backup copies from being relied on as valid backup copies. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
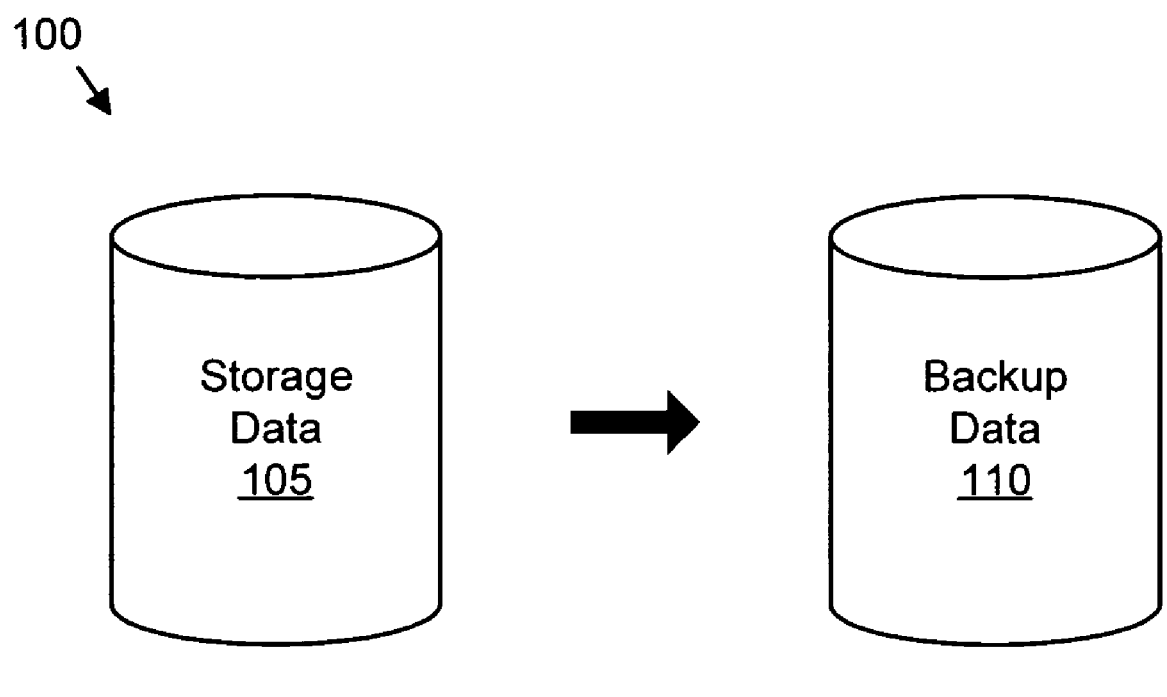
FIG. 1 is a schematic block diagram illustrating one embodiment of a storage data backup.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 2:
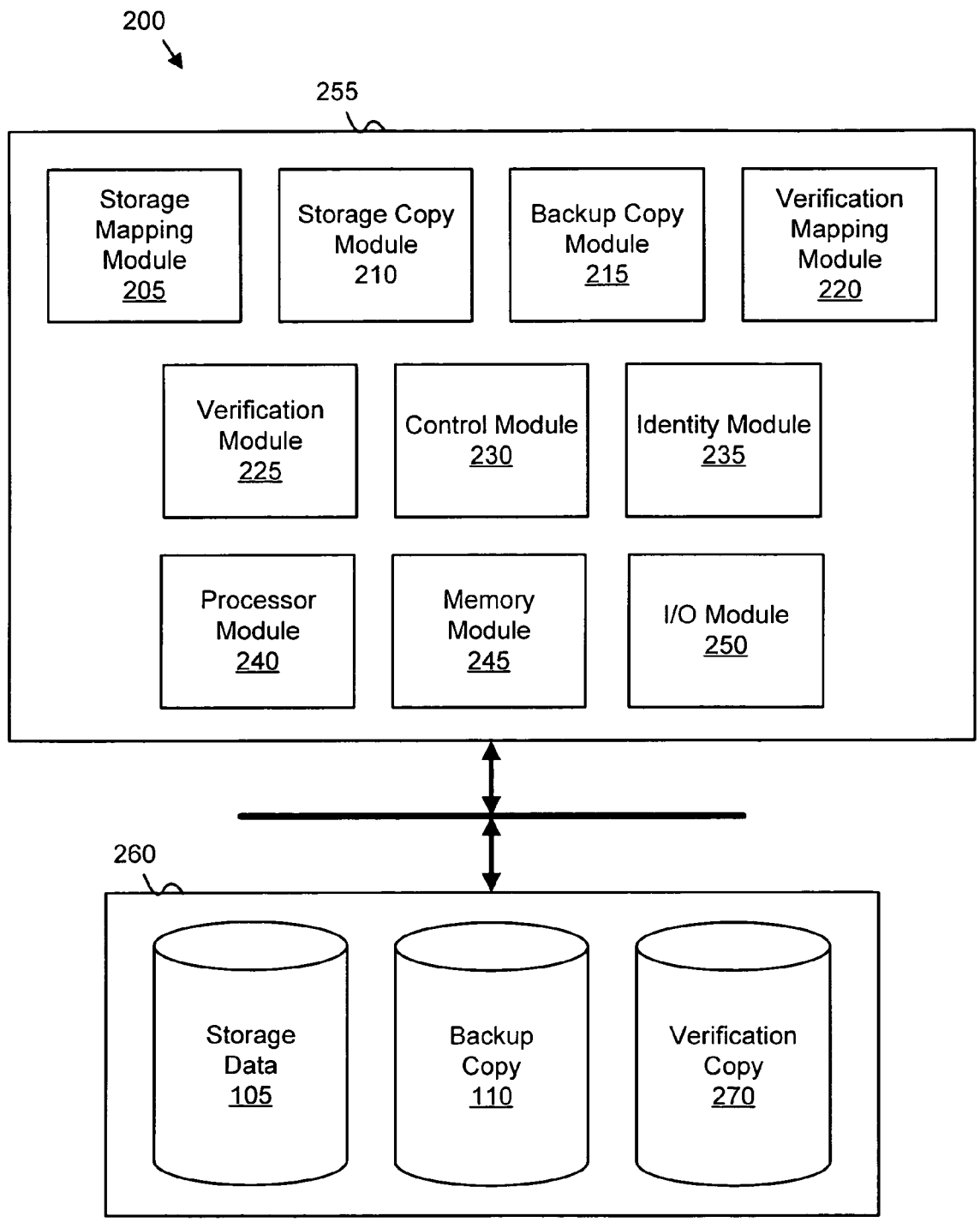
FIG. 2 is a schematic block diagram illustrating one embodiment of a verification system of the present invention.

FIG. 2 is a schematic block diagram illustrating one embodiment of a verification system 200 of the present invention. The verification system 200 includes a storage system 260 and a data processing device 265 including an input/output ("I/O") module 250, a memory module 245, a processor module 240, a storage mapping module 205, a storage copy module 210, a backup copy module 215, a verification mapping module 220, and a verification module 225. In one embodiment, the verification system 200 also includes a control module 230 and an identity module 235.

The data processing device 265 may be a computer, a network server, an embedded controller or the like. In the depicted embodiment, the data processing device 265 comprises a processor module 240 and a memory module 245 that execute software programs and manipulate data as is well known by those skilled in the art. The storage system 260 stores storage data 105. The storage data 105 may be a database, data files or the like and may comprise a plurality of data blocks. The data processing device 265 communicates with the storage system 260 through the I/O module 250, and stores and retrieves data blocks to the storage data 105. Because the storage data 105 may be highly valuable, the verification system 100 periodically creates a backup copy 110 of the storage data 105 so that the storage data 105 may be recovered if the storage data 105 is lost or corrupted. For example, the storage data 105 may become corrupted if invalid data is inadvertently written to the storage data 105. The storage data 105 can be recovered from the backup copy 110 only if the backup copy 110 is a valid copy of the storage data 105. The verification system 100 verifies the backup copy 110 to assure that the backup copy 110 can be relied on to recover the storage data 105.

The identity module 235 identifies the storage data 105 on the storage system. In one embodiment, the identity module 235 identifies the storage data 105 from parameters supplied by a user. For example, the user may supply parameters identifying one or more data files as the storage data 105.

The storage mapping module 205 maps the storage data to an application module. As used herein, mapping refers to associating data such as the storage data 105 with one or more application module configured to manipulate the data. The application module may be a database application program, a data file management program, or the like. In one embodiment, the application module resides on the memory module 245. In an alternate embodiment, the application module is stored on the storage system 260.

The storage copy module 210 copies the storage data 105 to a backup copy 110. The backup copy 110 is a copy of an instance in time of the storage data 105. The backup copy module 215 copies the backup copy 110 to a verification copy 270. Both the verification copy 270 and the backup copy 110 are identical copies of the storage data 105 instance. The verification mapping module 220 maps the verification copy 270 to the application module using the storage mapping module's 205 mapping of the storage data 105 to the application module. The verification module 225 verifies the verification copy 270 using the application module. In one embodiment, the verification copy 270 is valid if the application module successfully loads and uses the verification copy 270. The backup copy 110 cannot be inadvertently corrupted by the verification module 225 as the verification module 225 only uses the application module to verify the verification copy 270.

In one embodiment, if the verification copy is a valid copy, the control module 230 marks the backup copy 110 as valid. The verification system 100 verifies the backup copy 110 is valid without compromising the backup copy 110 by manipulating the backup copy 110.

Figure 3:
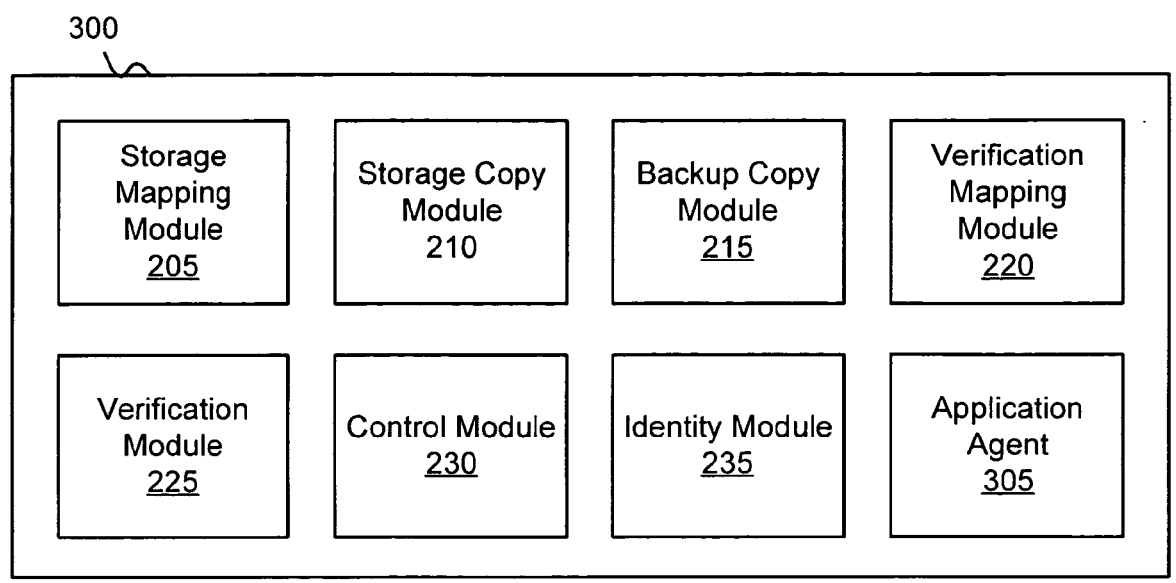
FIG. 3 is a schematic block diagram illustrating one embodiment of a verification apparatus in accordance with the present invention.

FIG. 3 is a schematic block diagram illustrating one embodiment of a verification apparatus 300 of the present invention. The identity module 235 identifies storage data 105 for backup. The storage mapping module 205 maps the storage data 105 to an application module. In one embodiment, the storage mapping module 205 maps the storage data 105 to a plurality of application modules. The application module is configured to verify the storage data. In one embodiment, the application module verifies the storage data by successfully loading the storage data. The application module may also be configured to manipulate the storage data 105.

For example, the application module may be a database application program configured to manipulate data in a database, and the storage data 105 may be a database containing one or more elements such as data files, data tables, queries, forms, reports, and the like. The database application program may be configured with one or more software processes such as database manipulation programs, query processes, form processes, report processes, and the like. The storage mapping module 205 maps each element of the database to each element of the database application program required to load and use the database element. Thus a data table, for example, is associated with each software process required to load and use the data table.

The storage copy module 210 is configured to copy the storage data 105 to a backup copy 110. In one embodiment, the storage copy module 210 creates an application agent 305. The application agent 305 is configured to initiate copying the storage data 105 to the backup copy 110 in response to a directive from the storage copy module 210. In addition, the application agent 305 receives notification of completion of the copy and notifies the storage copy module 210. The application agent 305 may complete the copy of the storage data 105 to the backup copy 110 independently of the storage copy module 210.

The backup copy module 215 copies the backup copy 110 to a verification copy 270. The verification mapping module 220 maps the verification copy 270 to the application module. For example, if the verification copy 270 is a copy of a database and the application module is a database application program, the verification mapping module 220 maps each element of the database to each element of the database application program required to load and manipulate the database element. The verification mapping module's 220 mapping to the application module follows the storage mapping module's 205 mapping of the storage data 105 to the application module. The verification module 225 verifies the verification copy 270 using the application module. In one embodiment, the application module verifies the storage data by successfully loading the verification copy. For example, the verification module 225 may direct the database application program to load and use a database verification copy 270. The verification module 225 determines the verification copy 270 is valid if the database application program successfully loads and/or manipulates the verification copy 270.

If the verification copy 270 is valid, the backup copy 110 is also valid as the backup copy 110 is identical to the verification copy 270. The verification apparatus 300 does not directly verify the backup copy 110 to prevent inadvertent corruption of the backup copy 110. In one embodiment, the verification apparatus 300 further comprises a control module 230. The control module 230 may mark the backup copy 110 as valid if the verification copy 270 is valid. In a certain embodiment, the control module 230 sets an identifier associated with the backup copy 110 to mark the backup copy 110. For example, the control module 230 may write a specified code to a data file associated with the backup copy 110. The specified code indicates that the backup copy 110 is valid.

In one embodiment, the control module 230 deletes the backup copy 110 if the verification copy 270 is invalid. In a certain embodiment, the control module 230 copies the valid backup copy 110 to an archive copy. The verification apparatus 300 verifies that the backup copy 110 is valid so that an invalid backup copy 110 is not relied on.

Figure 4:
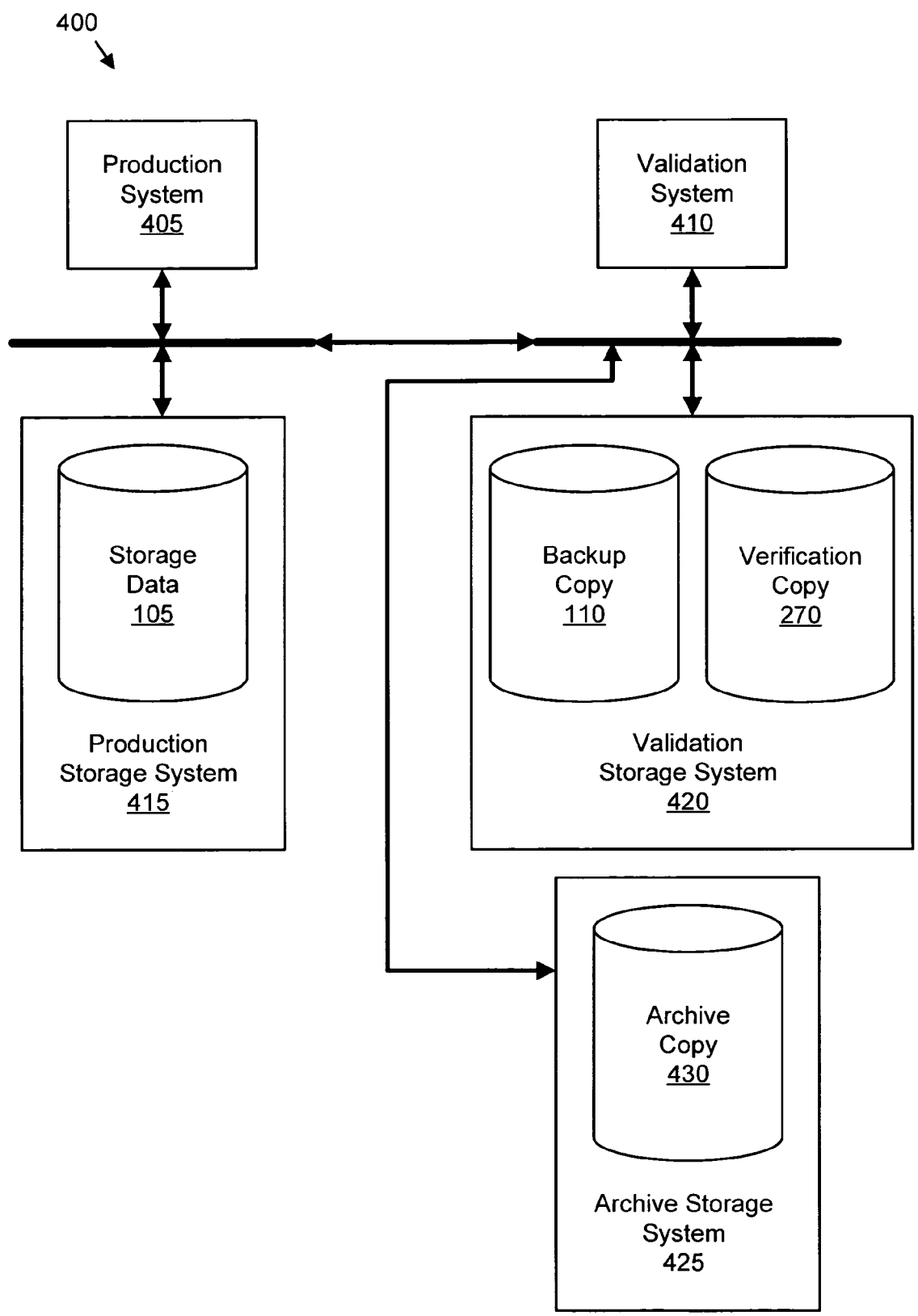
FIG. 4 is a schematic block diagram illustrating one embodiment of a backup system of the present invention.

FIG. 4 is a schematic block diagram illustrating one embodiment of a backup system 400 of the present invention. The backup system 400 includes a production system 405, a validation system 410, a production storage system 415, a validation storage system 420, and an archive storage system 425. The production system 405 may be a S/360 3090 manufactured by International Business Machines Corporation ("IBM") of Armonk, N.Y. and the production storage system 415 may be an Enterprise Storage System manufactured by IBM. Although one production system 405 and one production storage system 415 are depicted, any number of production systems 405 and production storage systems 415 may be employed.

The production system 405 manipulates storage data 105 stored in the production storage system 415 using an application module such as SAP database software manufactured by SAP AG of Mannheim, Germany. The validation system 410 may be the data processing device 265 depicted in FIG. 2. The storage mapping module 205 of the validation system 410 maps the storage data 105 of the production storage system 415 to the application module. The storage copy module 210 of the validation system 410 copies the storage data 105 to the backup copy 110 and the backup copy module 215 of the validation system 410 copies the backup copy 110 to the verification copy 270. Both the backup copy 110 and verification copy 270 reside on the validation storage system 220.

The verification mapping module 220 of the validation system 410 maps the verification copy 270 to the application module. The verification module 225 of the validation system 410 employs the application module to verify the verification copy 270. For example, if the application module is SAP database software and the storage data 105 is a SAP database, the verification module 225 of the validation system 410 verifies the verification copy 270 by loading the SAP database to the SAP database software. If the SAP database loads successful, the validation system 410 has also verified that the backup copy 110. The control module 230 of the validation system 410 may copy the backup copy 410 to an archive copy 430 of an archive storage system 425. For example, the validation system 410 may copy the backup copy 110 to a magnetic tape storage media archive copy 430. The backup system 400 verifies that the backup copy 110 is valid before relying on the backup copy 110 subsequent data protection operations such as creating an archive copy 430.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
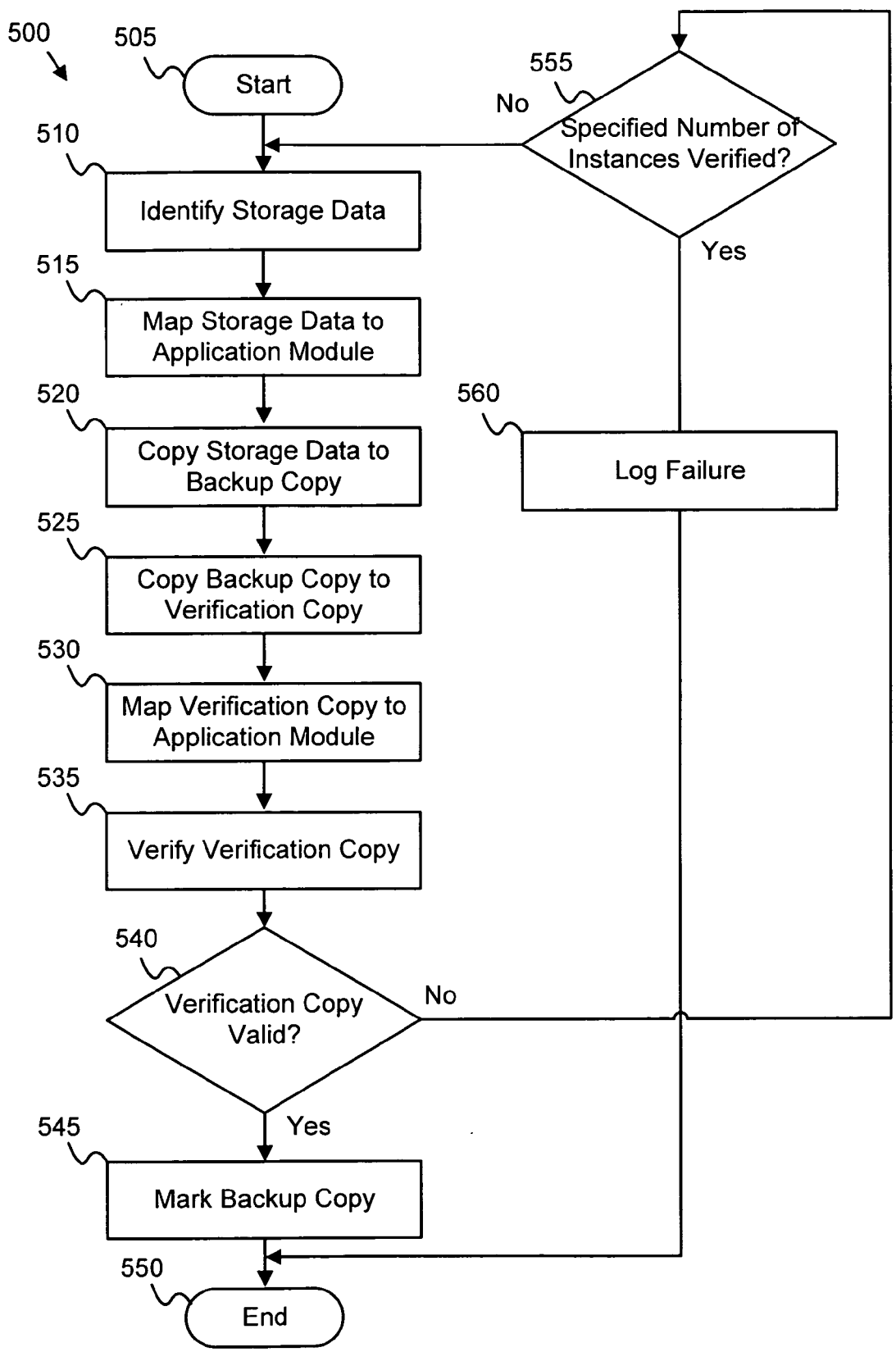
FIG. 5 is a schematic flow chart diagram illustrating one embodiment of a backup verification method in accordance with the present invention.

FIG. 5 is a schematic flow chart diagram illustrating one embodiment of a backup verification method 500 in accordance with the present invention. The backup verification method 500 starts 505. The identity module 235 identifies 510 storage data 105 for verification and backup. In one embodiment, the identity module 235 identifies the storage data 105 based on user-defined parameters. The parameters may specify one or more files, directories, or storage volumes. For example, a user may specify that all storage data stored in a storage volume be verified and backed up.

The storage mapping module 205 maps 515 the storage data 105 to an application module. In one embodiment, the storage mapping module 205 identifies the type of each file comprising the storage data 105. The storage mapping module 205 associates or maps 515 each file to the application module required to verify the file. In one embodiment, the application module is the application program used to load and manipulate the file. For example, if a file of the storage data 105 is an Oracle database created by Oracle database software manufactured by Oracle Corporation of Redwood Shores, Calif., the storage mapping module 205 maps 515 the file to each element of the Oracle database software required to load and manipulate the file. In an alternate embodiment, the application module is an application program specifically designed to verify the file of the storage data 105.

The storage copy module 210 copies 520 the storage data 105 to a backup copy 110. The backup copy 110 is an instance of the storage data 105. If the storage copy module 210 subsequently copies 520 the storage data 105 to the backup copy 110, the subsequent backup copy 110 may be a different storage data 105 instance. In one embodiment, the storage copy module 210 employs an application agent 305 to copy 520 the storage data 105 to the backup copy 110.

In one embodiment, the storage copy module 210 copies 520 a subset of the storage data 105 to the backup copy 110. The subset comprises one or more modified data blocks of the storage data 105. The modified data block may be an incremental backup of a second instance of the storage data 105. For example, the storage copy module 210 may copy 520 a first instance of the storage data 105 to the backup copy 110 and subsequently copy a data block that has been modified subsequent to the backup of a first instance of the storage data 105 to the backup copy 110 as an incremental backup. The modified data blocks of the backup copy 110 of the may be combined with the backup of the first storage data 105 instance to form a backup copy 110 of the second storage data 105 instance.

The backup copy module 215 copies 525 the backup copy 110 to the verification copy 270. Both the backup copy 110 and the verification copy 270 are identical. In one embodiment, the backup copy 110 and the verification copy 270 reside on a validation storage system 420. In an alternate embodiment, the backup copy 110 and verification copy 270 reside on separate storage systems 260.

The verification mapping module 220 maps 530 the verification copy 270 to the application module using the mapping of the storage data 105 to the application module of the storage mapping module 205. In one embodiment, the application module is an identical but separate instance of the application module that the storage mapping module 205 mapped 515 to the storage data 105. For example, if the storage mapping module 205 mapped 515 the Oracle database to a first instance Oracle database software, the verification mapping module 220 maps 530 the verification copy 270 of the Oracle database to a second identical instance of Oracle database software. In an alternate embodiment, the application module is the same instance of the application module that the storage mapping module 205 mapped 515 to the storage data 105.

The verification module 225 verifies 535 the verification copy 270 using the application module mapped 530 to the verification copy 270 by the verification mapping module 220. In one embodiment, the verification module 225 verifies 535 the verification copy 270 by loading the verification copy 270 to the application module. The verification copy 270 is a valid copy if the application module successfully loads the verification module. For example, the verification module 225 may direct the Oracle database software to load the Oracle database of the verification copy 270. If the Oracle database successfully loads, the verification copy 270 of the Oracle database is valid. If the Oracle database does not successfully load, the verification copy 270 is invalid. If the verification copy 270 is valid, the backup copy 110 is also valid but if the verification copy 270 is invalid, the backup copy 110 is also invalid. Because the backup copy 10 has not been manipulated or corrupted by the verification module 225, the validated backup copy 110 can be relied on as a valid copy of the storage data 105.

If the verification module 225 determines 540 the verification copy 270 is valid, the control module 230 marks 545 the backup copy 110 as a valid copy and the method 500 ends 550. In one embodiment, the control module 230 marks 545 the backup copy 110 by setting an identifier associated with the backup copy 110 to mark the backup copy 110. For example, the control module 230 may create a reference file associated with the backup copy 110. The reference file indicates that the backup copy 110 is valid. In one embodiment, the control module 230 retains the backup copy 110 if the verification copy 270 is valid and deletes the backup copy 110 if the verification copy 270 is invalid. In a certain embodiment, the control module 230 marks 545 the backup as a valid copy by copying the backup copy 110 to an archive copy 430. The archive copy 430 may reside on an archive storage system 425 such as a magnetic tape storage system.

In one embodiment, if the verification module 225 determines 540 the verification copy 270 is invalid, the control module 230 determines 555 if a specified number of storage data 105 instances have been verified. If the specified number of storage data 105 instances have not been verified, the identity module 235 identifies 510 a subsequent instance of the storage data 105 for verification and backup. The data errors of the subsequent instance of the storage data 105 may have been identified and resolved, so that the verification copy 270 of the subsequent instance of the storage data 105 may be verified 535 as valid by the verification module 225.

If the verification module 225 determines 540 the verification copy 270 is invalid and the control module 230 determines 555 the specified number of storage data 105 instances have been verified, the control module 230 may log 560 the failure and terminate the method 550. For example, a user may specify verifying up to ten (10) instances of backup copies 110 of the storage data 105. If the control module 230 determines 555 a valid verification copy 270 is not verified in ten (10) instances of the storage data 105, the control module 230 may log 560 the failure and terminate 550 the method 500. Limiting verification of backup copies 110 to a specified number of storage data 105 instances prevents wasting resources verifying storage data 105 with errors that are unlikely to be repaired. The backup verification method 500 verifies 535 a backup copy 110 is valid by verifying 535 a verification copy 270 of the backup copy 110 is valid before the backup copy 110 is relied on. The method 500 may repeatedly verify 535 instances of the storage data 105 until a valid backup copy is identified.

Figure 6:
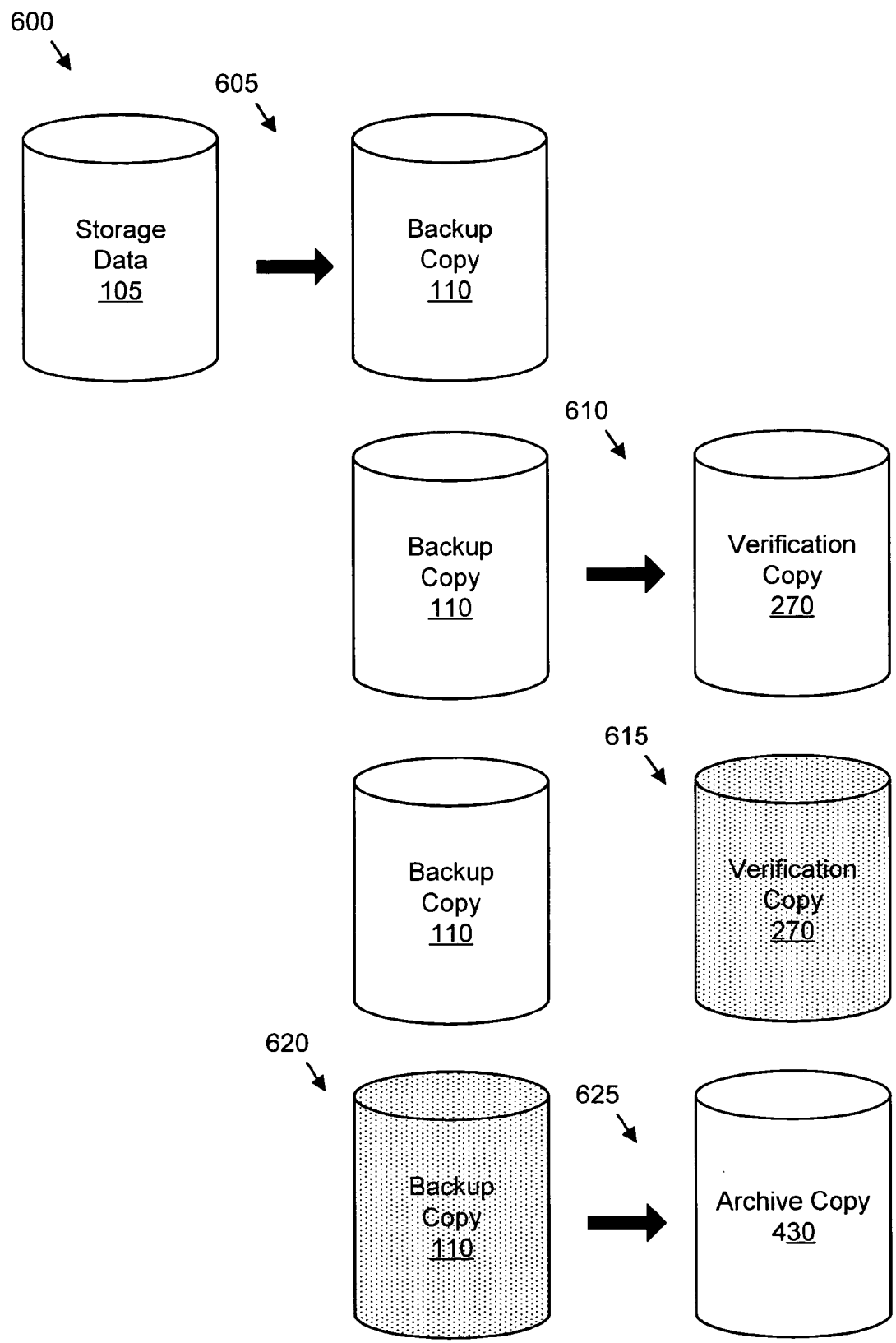
FIG. 6 is a schematic block diagram illustrating one embodiment of verification dataflow in the present invention.

FIG. 6 is a schematic block diagram illustrating one embodiment of verification data flow 600 in the present invention. The storage copy module 210 copies 605 an instance of storage data 105 to a backup copy 110. The backup copy module 215 copies 610 the backup copy 110 to the verification copy 270. The backup copy 110 and the verification copy 270 are identical copies. The verification mapping module 220 maps the verification copy 270 to an application module using the mapping of the storage data 105 to the application module created by the storage mapping module 205, and the verification module 225 verifies 615 the verification copy 270. If the verification copy 270 is valid, the backup copy 110 is also valid. The backup copy 110 was not verified 615 directly, so that the backup copy 110 was not corrupted and can be relied on as an instance of the storage data 105 that can be loaded and used if the instance of the storage data 105 must be recovered. The backup copy 110 is marked 620 as valid. In addition, the backup copy 110 may be copied 625 to an archive copy 430.

Figure 7:
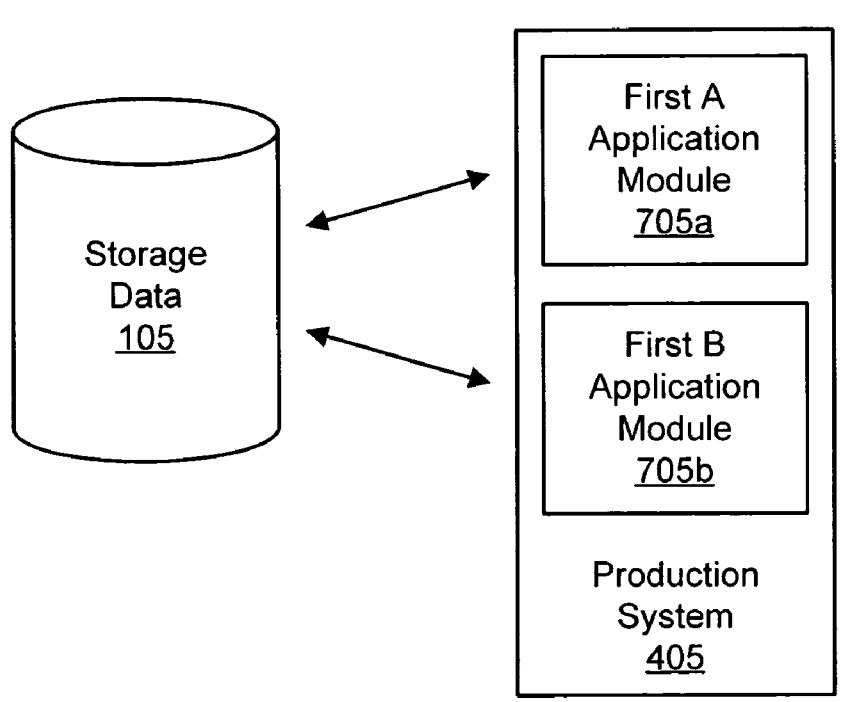
FIG. 7 is a schematic block diagram illustrating one embodiment of data to application module mapping of the present invention.
Figure 7:
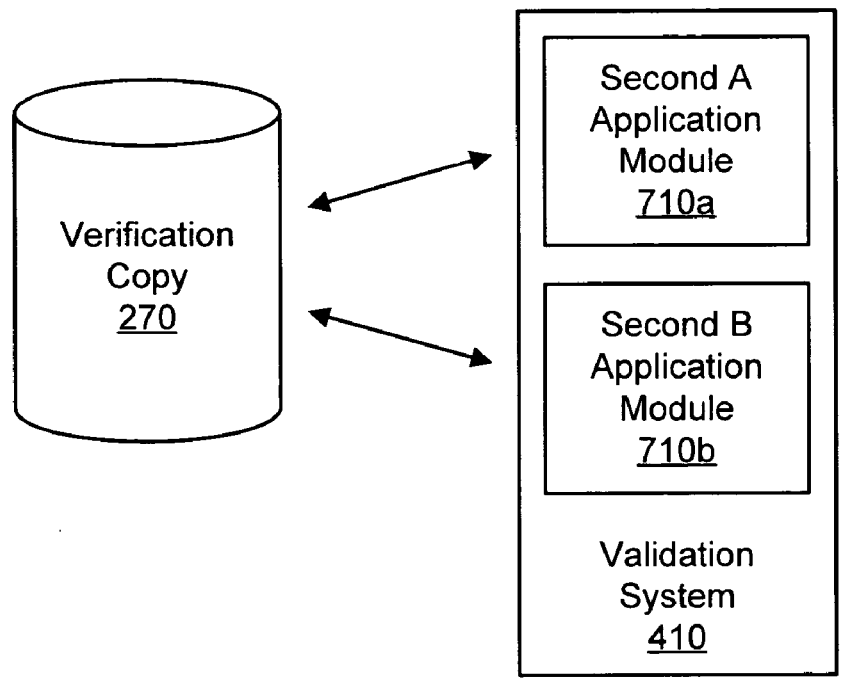

FIG. 7 is a schematic block diagram illustrating one embodiment of data to application module mapping 700 of the present invention. A production system 405 comprises two first application modules 705a, 705b. In one embodiment, the production system 405 is the production system 405 depicted in FIG. 4. Although the production system 405 is depicted with two first application modules 705a, 705b, any number of first application modules 705a, 705b may be employed. The production system 405 uses the first application modules 705a, 705b to load and manipulate the storage data 105.

A validation system 410 also comprises two second application modules 710b, 710b. In one embodiment, the validation system 410 is the validation system 410 depicted in FIG. 4. Although the validation system 410 is also depicted with two second application modules 710a, 710b, any number of second application modules 710a, 710b may be employed. The first A application module 705a is identical the second A application module 710a and the first B application module 705b is identical to the second B application module 710b. In one embodiment, the validation system 410 is configured with each application module of the production system 405.

The storage mapping module 205 maps 515 the storage data 105 to the first application modules 705a, 705b of the production system 405. The verification mapping module 220 maps 530 the verification copy 270 to the second application modules 710a, 710b using the mapping of the storage mapping module 205. In one embodiment, the storage mapping module 205 creates a linked list of all elements in the storage data 105 and the corresponding first application modules 705a, 705b required to verify each element. The verification mapping module 220 may use the linked list to map the elements of the verification copy 270 which are copies of the elements of the storage data 105 to the second application modules 710a, 710b of the validation system 410. The validation system 410 may verify 535 of the verification copy 270 using the second application modules 710 which are identical instances of the first application modules 705. In addition, the validation system 410 may verify 535 the verification copy 270 without affecting the operation of the production system 405.

Figure 8:
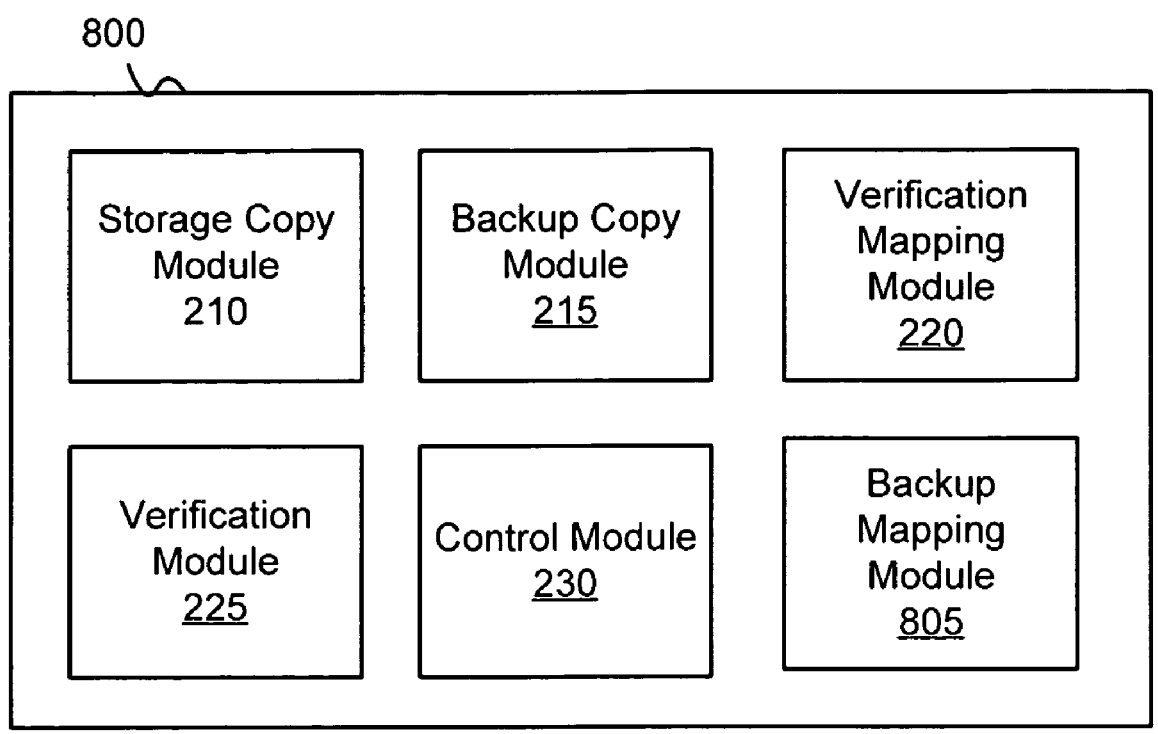
FIG. 8 is a schematic block diagram illustrating one embodiment of an alternate verification apparatus of the present invention.

FIG. 8 is a schematic block diagram illustrating one embodiment of an alternate verification apparatus 800 of the present invention. The apparatus 800 includes a backup mapping module 805. The storage copy module 210 copies 520 the storage data to a backup copy 110. The backup mapping module 805 maps the backup copy 110 to an application module. In one embodiment, backup mapping module 805 resides on a validation system 410 as depicted in FIG. 4. In addition, the backup mapping module 805 may map the backup copy 110 to a first application module 705a residing on a production system 405 as depicted in FIG. 7. In an alternate embodiment, the backup mapping module 805 maps the backup copy 110 to a second application module 710 residing on the validation system 410 as depicted in FIG. 7. The backup mapping module 805 may map the backup copy 110 to the second application module 710 of the validation system 410 without affecting the first application module 705 of the production system 405.

The backup copy module 215 copies 525 the backup copy 110 to the verification copy 270 and the verification mapping module 220 maps 530 the verification copy 270 to the second application module 710. The verification module 225 verifies 535 the verification copy 270 using the second application module 710 mapped 530 to the verification copy 270 and the control module 230 marks 545 the backup copy 110 as valid. The apparatus 800 maps the backup copy 110 to an application module and uses the mapping to verify the verification copy 270 and the backup copy 110.

The present invention verifies a backup copy 110 of storage data 105 as valid using a verification copy 270 mapped to an application module 705 associated with the storage data 105. The present invention prevents invalid backup copies 110 from being relied on as valid backup copies 110. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to verify backup data, the apparatus comprising:
   a storage mapping module configured to map storage data to a first application module configured to verify the storage data;
   a storage copy module configured to copy the storage data to a backup copy;
   a backup copy module configured to copy the backup copy to a verification copy;
   a verification mapping module configured to map the verification copy to the first application module responsive to the mapping of the storage data to the first application module; and
   a verification module configured to verify the verification copy using the first application module and
   wherein the verification mapping module maps the verification copy to a second application module configured as an instance of the first application module.

2. The apparatus of claim 1, further comprising a control module configured to mark the backup copy as valid if the verification copy is verified by the first application module.

3. The apparatus of claim 2, wherein the storage data is a first storage data instance and wherein the control module is further configured to direct the storage copy module, the backup copy module, the verification mapping module, and the verification module to verify a second storage data instance if the verification copy of the backup copy of the first storage data instance is invalid.

4. The apparatus of claim 3, wherein the control module further directs the verification of a plurality storage data instances until the verification copy of the backup copy of at least one storage data instance is valid or until a specified number of storage data instances have been verified.

5. The apparatus of claim 4, wherein the second application module is configured on a validation system.

6. The apparatus of claim 1, further comprising an identity module configured to identify the storage data.

7. The apparatus of claim 1, wherein the storage copy module is further configured to copy at least one modified data block configured as a subset of the storage data to the backup copy as an incremental backup, the backup copy module is configured to copy the at least one modified data block of the backup copy as the verification copy, the verification mapping module is configured to map the at least one modified data block of the verification copy to the first application module, and the verification module is configured to verify the at least one modified data block of the verification copy.

8. The apparatus of claim 1, further comprising an application agent configured to initiate copying the storage data to the backup copy responsive to a directive from the storage copy module, receive notification of completion of the copy, and notify the storage copy module of the completion of the copy.

9. A system to verify backup data, the system comprising:
a storage system configured to store data; and
a data processing device comprising:
an input/output module;
a memory module;
a processor module;
a storage mapping module configured to map storage data to a first application module configured to verify the storage data;
a storage copy module configured to copy the storage data to a backup copy;
a backup copy module configured to copy the backup copy to a verification copy;
a verification mapping module configured to map the verification copy to the first application module responsive to the storage mapping module mapping of the storage data to the first application module; and
a verification module configured to verify the verification copy using the first application module and
wherein the storage data is a first storage data instance and wherein the control module is further configured to direct the storage copy module, the backup copy module, the verification mapping module, and the verification module to verify a second storage data instance if the verification copy of the backup copy of the first storage data instance is invalid.

10. The system of claim 9, the data processing device further comprising a control module configured to mark the backup copy as valid if the verification copy is verified by the first application module.

11. The system of claim 9, wherein the control module further directs the verification of a plurality storage data instances until the verification copy of the backup copy of at least one storage data instance is valid or until a specified number of storage data instances have been verified.

12. The system of claim 9, wherein the verification mapping module maps the verification copy to a second application module configured as an instance of the first application module.

13. The system of claim 9, further comprising an identity module configured to identify the storage data.

14. The system of claim 9, wherein the storage copy module is further configured to copy at least one modified data block configured as a subset of the storage data to the backup copy as an incremental backup, the backup copy module is configured to copy the at least one modified data block of the backup copy as the verification copy, the verification mapping module is configured to map the at least one modified data block of the verification copy to the first application module, and the verification module is configured to verify the at least one modified data block of the verification copy.

15. A computer readable storage medium tangibly embodying a program of machine-readable instructions executable by a digital processing apparatus to perform operations to verify backup data, the operations comprising:
mapping storage data to a first application module configured to verify the storage data;
copying the storage data to a backup copy;
copying the backup copy to a verification copy;
mapping the verification copy to the first application module responsive to the mapping of the storage data to the first application module; and
verifying the verification copy using the first application module and;
mapping the verification copy to a second application configured as an instance of the first application module.

16. The computer readable storage medium of claim 15, wherein the instructions further comprise operations to mark the backup copy as valid if the verification copy is verified by the first application module.

17. The computer readable storage medium of claim 16, wherein the storage data is a first storage data instance and wherein the instructions further comprise operations to verify a second storage data instance if the verification copy of the backup copy of the first storage data instance is invalid.

18. The computer readable storage medium of claim 17, wherein the instructions further comprise operations to verify a plurality of storage data instances until the verification copy of the backup copy of at least one storage data instance is valid or until a specified number of storage data instances have been verified.

19. The computer readable storage medium of claim 15, wherein the instructions further comprise operations to identify the storage data.

20. The computer readable storage medium of claim 15, wherein the instructions further comprise operations to copy the backup copy to an archive copy.

21. The computer readable storage medium of claim 15, wherein the instructions further comprise operations to create a application agent configured to initiate copying the storage data to the backup copy responsive to a directive from the storage copy module, receive notification of completion of the copy, and notify the storage copy module of the completion of the copy.

22. The computer readable storage medium of claim 15, wherein the instructions further comprise operations to copy at least one modified data block configured as a subset of the storage data to the backup copy as an incremental backup, copy the at least one modified data block of the backup copy as the verification copy, map the at least one modified data block of the verification copy to the first application module, verify the at least one modified data block of the verification copy.

* * * * *